Inventor
Edward R. Nyland

Jan. 9, 1940.  E. R. NYLAND  2,186,304
GEAR LAPPING MACHINE
Filed Sept. 29, 1937    11 Sheets-Sheet 6

Inventor
Edward R. Nyland
By
Blackmore, Spencer & Hurt
Attorneys

Jan. 9, 1940.　　　　E. R. NYLAND　　　　2,186,304
GEAR LAPPING MACHINE
Filed Sept. 29, 1937　　　11 Sheets-Sheet 7

Inventor
Edward R. Nyland
By Blackmore, Spencer & Flint
Attorneys

Inventor
Edward R. Nyland

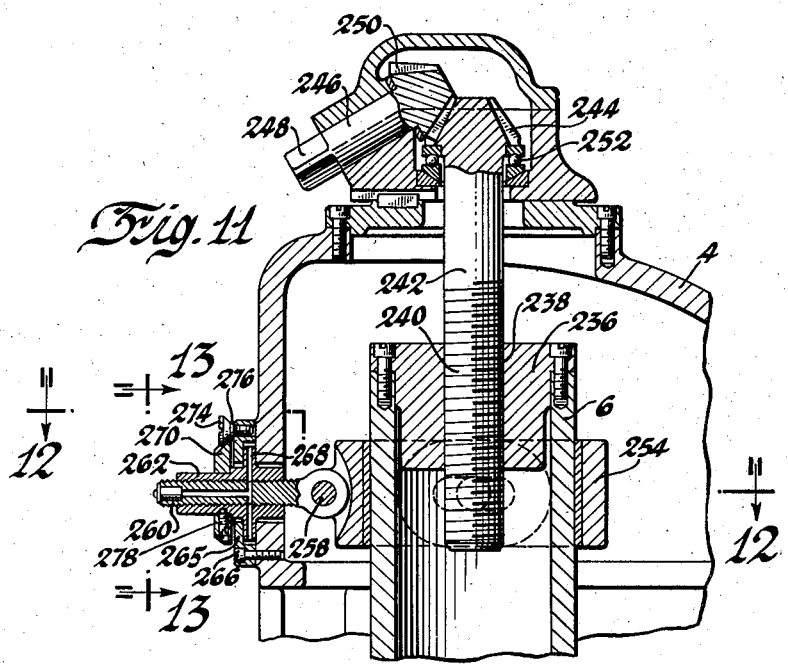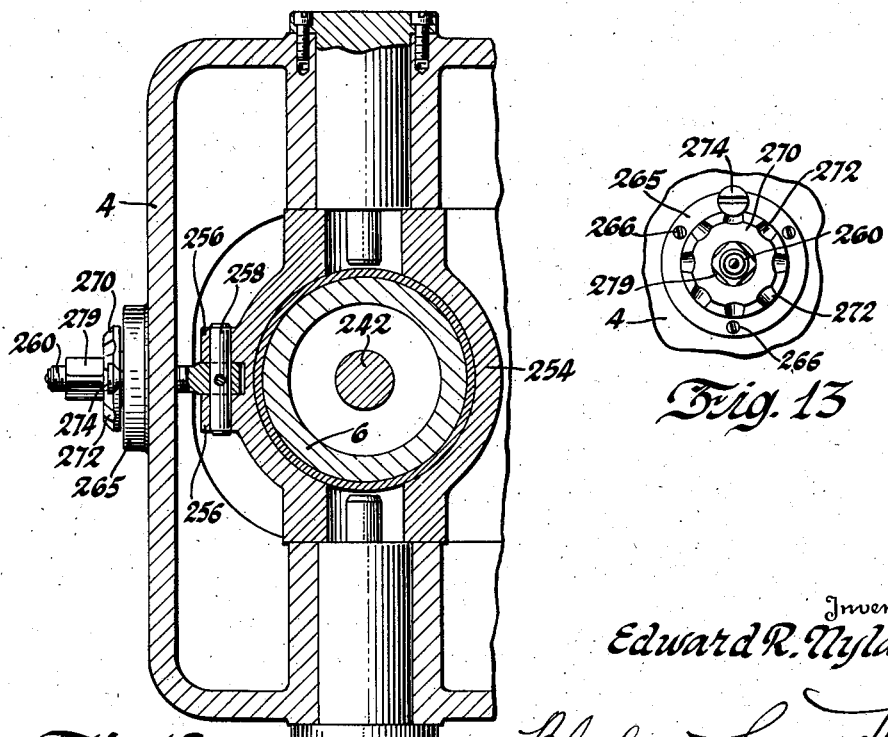

Jan. 9, 1940.  E. R. NYLAND  2,186,304

GEAR LAPPING MACHINE

Filed Sept. 29, 1937   11 Sheets—Sheet 10

Inventor
Edward R. Nyland
By Blackmore, Spencer & Flint
Attorneys

Jan. 9, 1940.  E. R. NYLAND  2,186,304
GEAR LAPPING MACHINE
Filed Sept. 29, 1937  11 Sheets-Sheet 11

Inventor
Edward R. Nyland
By Blackmore, Spencer & Flint
Attorneys

Patented Jan. 9, 1940

2,186,304

UNITED STATES PATENT OFFICE 2,186,304

GEAR LAPPING MACHINE

Edward R. Nyland, Detroit, Mich., assignor to General Motors Corporation, Detroit, Mich., a corporation of Delaware Application September 29, 1937, Serial No. 166,245

15 Claims. (Cl. 51—26)

This invention relates to the art of finishing gears and the like, and particularly to a machine for finishing gears by means of a lapping operation.

Certain inaccuracies may occur in the surfaces or contours of gear teeth during their manufacture as a result of the gear cutting operation or in the warping or distortion incident to the subsequent heat treatment thereof. In order to smooth and true up the gear teeth it is customary to finish the gears by means of a lapping operation. The primary object of this invention is to provide an improved machine for lapping gears and the like.

Another object of this invention is to provide a gear lapping machine that is highly efficient and rapid in operation and of simple construction.

It is also an object of this invention to provide an improved machine for lapping helical gears.

Still another object of this invention is to provide a gear lapping machine in which a simplified means is provided for quickly adjusting the machine for gears having different helical angles.

A further object of this invention is to provide a means of simple construction for moving the upper and lower centers of a gear lapping machine as a unit.

Another object is to provide a simplified means for quickly moving the upper center unit with respect to the lower center unit.

It is also an object of this invention to provide an improved angle adjusting means for changing the angle at which a gear is supported with respect to a lapping ring in order to remove a greater or less amount of material at either end of the teeth of the gear being lapped.

Other objects and advantages of this invention reside in various simplified adjusting means whereby the lapping machine may be quickly adjusted to meet variable conditions of operation.

Other objects and advantages of my invention will become more apparent as the description proceeds. Reference is herein made to the accompanying drawings forming a portion of this specification, in which:

Figure 11 is a view on line 11—11 in Figure 2 showing adjusting means.

Figure 12 is a view taken on line 12—12 in Figure 11.

Figure 13 is a detail view taken on line 13—13 in Figure 11.

Figure 1:
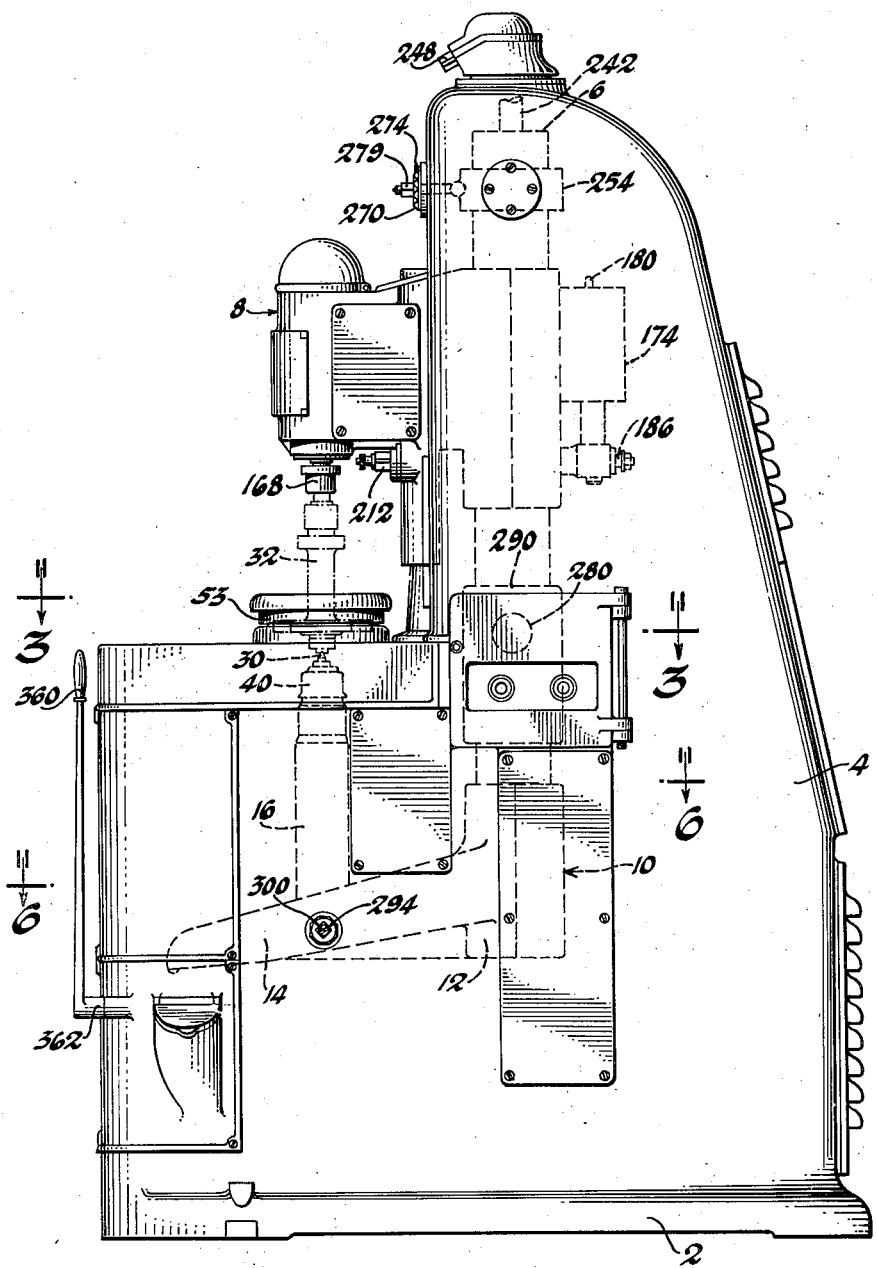
Figure 1 is a side elevation of the complete machine.

The embodiment of the invention shown in the drawings comprises a lapping ring having internal helical teeth formed therein. It will be understood, however, that the gear to be lapped may be a ring gear having internal teeth and the lap may have external teeth. The lap is adapted to be rotated in mesh with a gear to be lapped. The lapping ring is rapidly reciprocated with respect to the gear which causes relative sliding motion between the contacting teeth of the gear and lap. A suitable lapping compound is played on the lap and gear during the lapping operation. The gear and lap have a different number of teeth so that as the gear is driven by engagement with the teeth of the lapping ring, it rotates with respect to the lapping ring. This provides for more accurate work since different teeth of the lapping ring and gear will thus be brought in contact with each other. Means are provided whereby the reciprocation of the lapping ring causes the gear to be moved or rocked through an angle determined by the lead of the helical teeth of the lapping ring and gear in timed relation with the reciprocation. Certain features of the machine comprising the subject matter of the present invention are somewhat similar to those of the machine shown and claimed in my copending application, Serial No. 6,288, filed February 13, 1935, now Patent No. 2,108,547, dated February 15, 1938.

Figure 2:
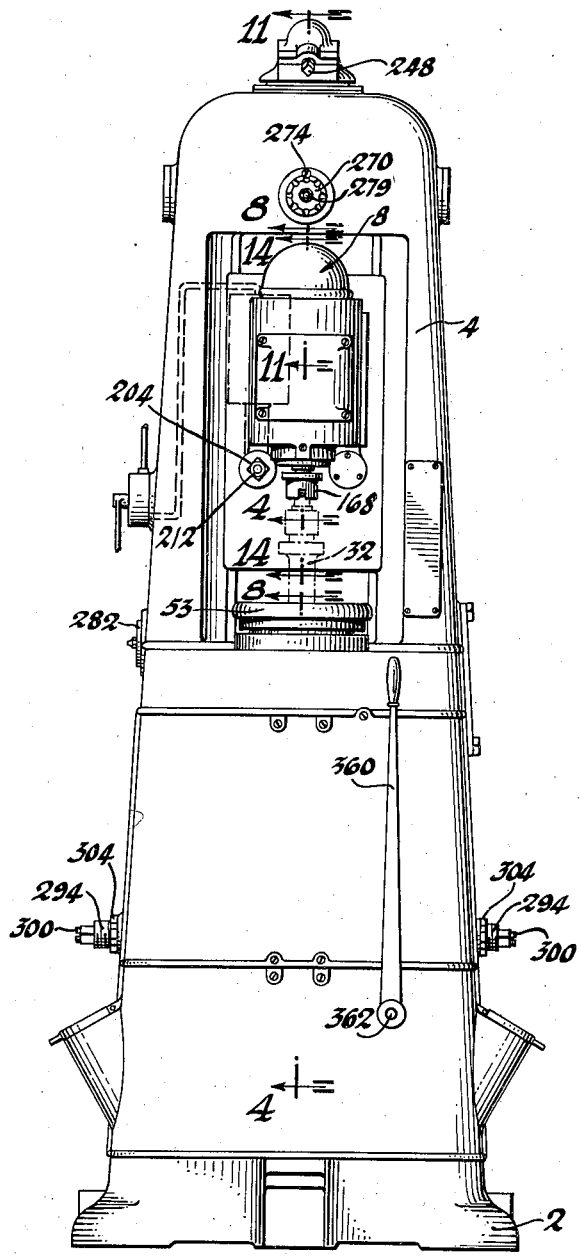
Figure 2 is a front elevation of the machine illustrated in Figure 1.

In Figures 1 and 2 of the drawings, the base of the machine is indicated at 2. Supported by the base of the machine is a main supporting frame 4, from the upper end of which is adjustably supported a hollow shaft 6; see also Figure 11. The hollow shaft 6 supports an upper center unit indicated generally at 8 and a lower center unit indicated generally at 10. Both of the units are adapted to be secured to the hollow shaft 6 so that they may be raised and lowered with the shaft as a unit.

Figure 3:
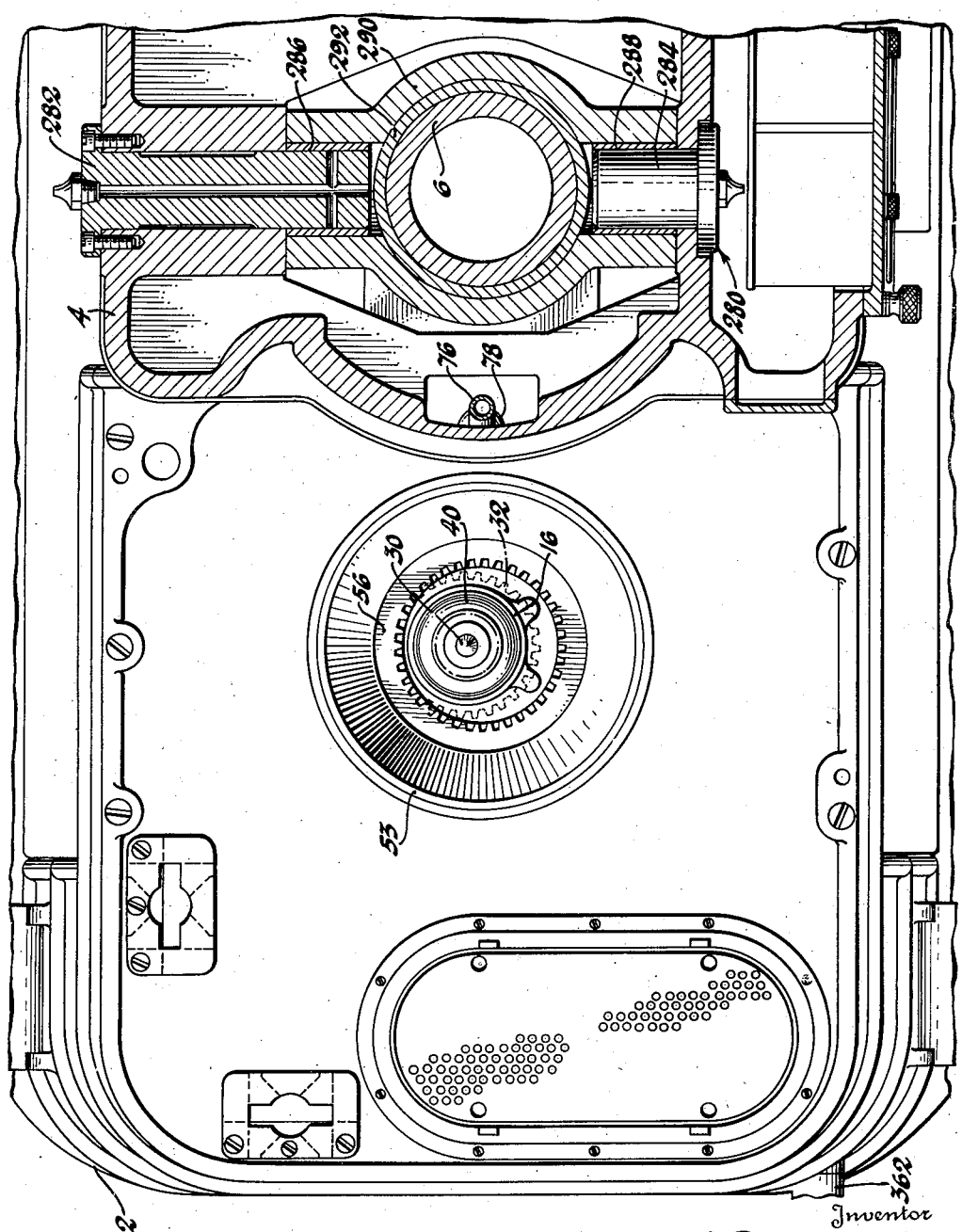
Figure 3 is a partial sectional view substantially on line 3—3 in Figure 1.
Figure 4:
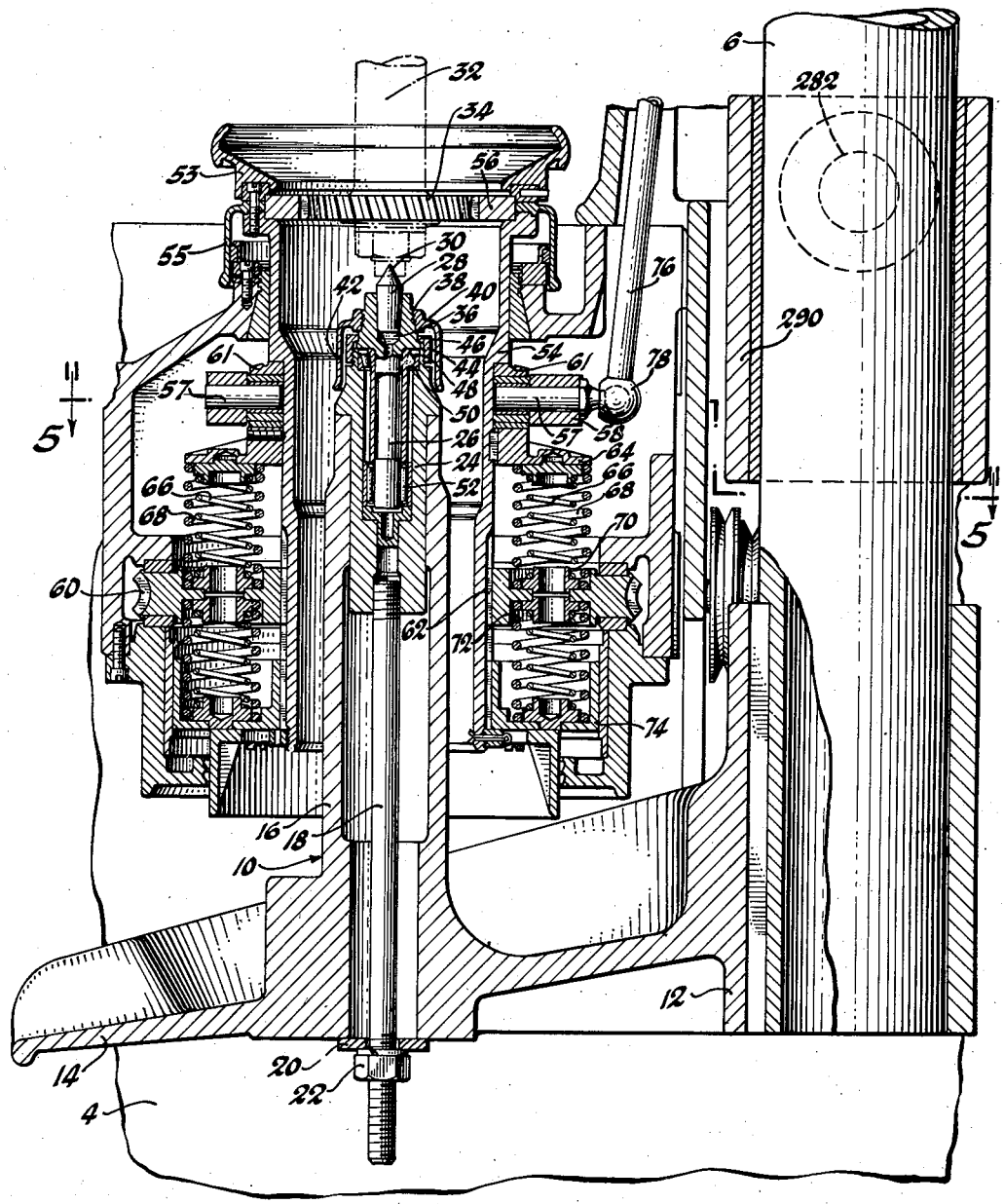
Figure 4 is a sectional view on line 4—4 in Figure 2 showing the lapping ring and associated parts.

The lower center unit is best seen in Figures 3 and 4. Secured to the lower portion of the hollow shaft 6 is a supporting member 12 having a trough portion 14, adapted to return lapping compound to the tank therefor, and a sleeve portion 16. Secured to the sleeve 16 by means of threaded rod 18, washer 20 and nut 22 is a flanged sleeve 24, the flange of which rests on the end of sleeve 16. Within the flanged sleeve 24 is rotatably mounted a spindle 26 having a lower center 28 formed with a conical end 30 adapted to engage one end of an arbor 32 to which is secured a gear 34 to be lapped. The lower center 28 is tapered and frictionally engages a tapered opening 36 formed in the upper end of the spindle 26.

Secured to the upper end of the spindle, as by means of the threaded connection 38, is a cover 40 having a downwardly extending sleeve portion 42 which protects the bearings from the lapping compound. A sleeve 44, having a flange portion 46 engaging a mating flange on the spindle and a threaded portion 48 engaging the upper portion of the flanged sleeve 24, prevents the spindle from being moved an excessive amount, although allowing the spindle to rotate within the sleeve. Suitable bearings 50 and 52 rotatably support the spindle.

Figure 5:
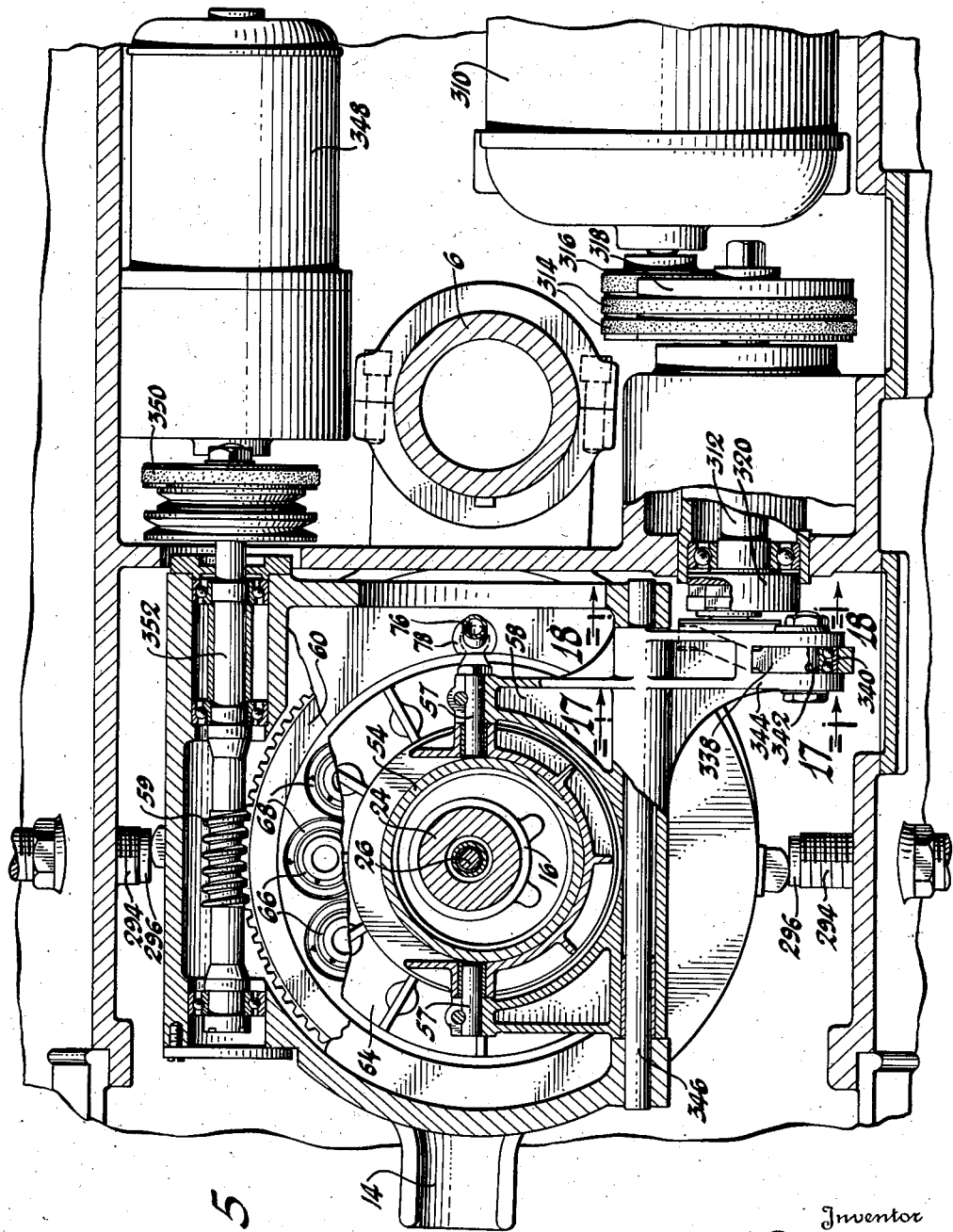
Figure 5 is a view substantially on line 5—5 in Figure 4 with parts broken away in order to show the construction more clearly.

Surrounding the spindle 26 and associated parts is a larger sleeve 54 having a flange at its upper end to which is fixed a lapping ring 56 by means of retainer 53. A cap 55 is also secured to the flange of the sleeve, as best seen in Figure 4. The sleeve 54 is adapted to be reciprocated by means of the yoke 58; see also Figure 5. The branches of the yoke embrace the sleeve and are connected by diametrically opposite pins 57 to a member 61 secured to the sleeve as will be readily understood from Figure 4. The sleeve is rotated by means of a worm 59 and a worm gear 60 which has a splined connection 62 with the sleeve 54 in order to allow the sleeve to be reciprocated by the yoke as described above.

Secured to the sleeve adjacent the yoke is a ring member 64 which surrounds the sleeve and acts as a stop or support for a circular series of coiled springs 66, 68. The other ends of the springs are mounted in a corresponding circular series of pockets 70 formed in the worm gear 60. A similar series of springs are mounted between aligned pockets 72 formed in the lower surface of the ring gear and cup-shaped members 74 secured to the lower portion of the sleeve. By means of the several springs excessive roughness or vibration due to the rapid rate of reciprocation of the sleeve and parts carried thereby will be obviated.

Figure 8:
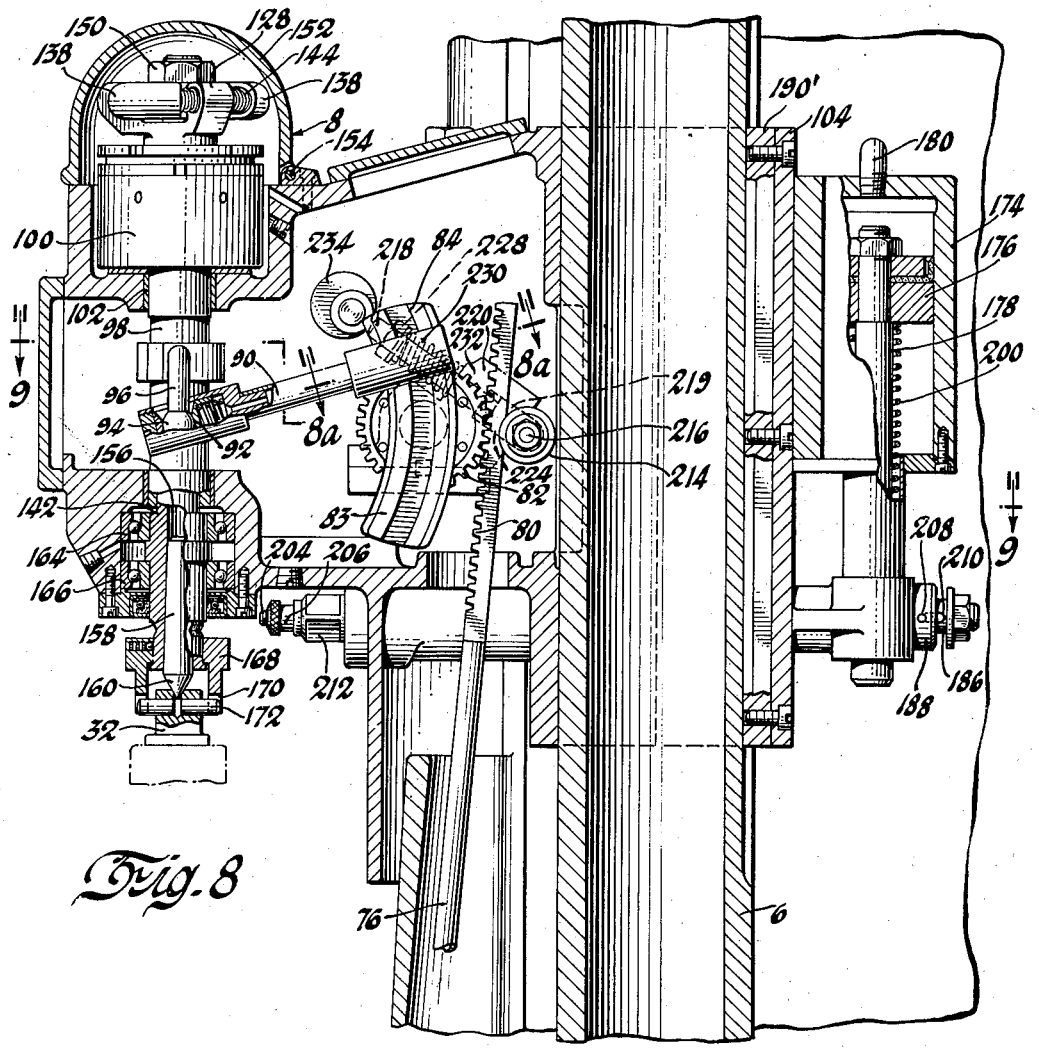
Figure 8 is a view on line 8—8 in Figure 2 showing the relationship of the parts of the upper center unit of the machine which oscillate the gear to be lapped.
Figure 8A:
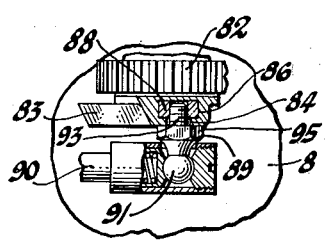
Figure 8a is a sectional view substantially on line 8a—8a in Figure 8 showing an adjusting means.
Figure 9:
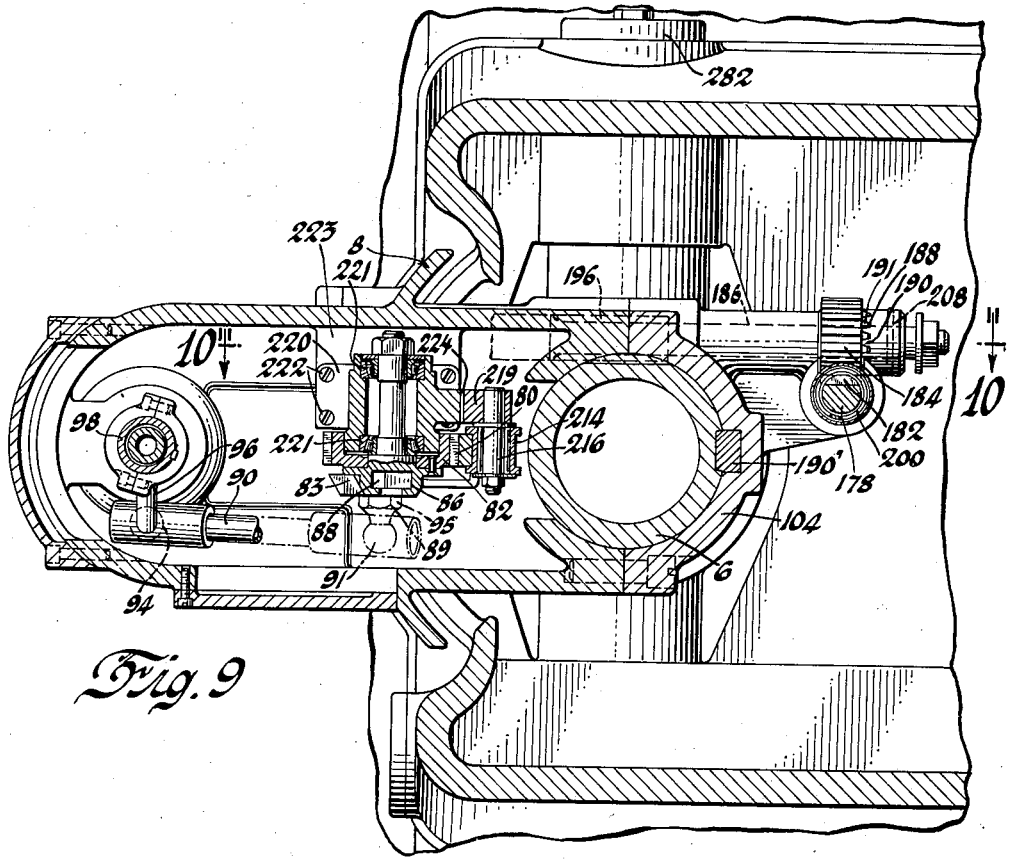
Figure 9 is a view taken on line 9—9 in Figure 8.
Figure 10:
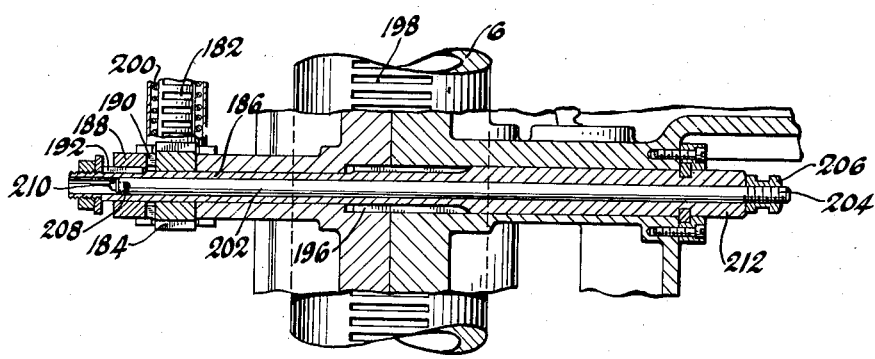
Figure 10 is a detail view on line 10—10 in Figure 9.

Reciprocation of the sleeve 54 actuates a rod 76 connected at one end by a ball and socket joint 78 with a portion of the yoke. As best seen in Figures 8 and 9 the upper end of the rod has a rack portion 80 adapted to mesh with, and rock back and forth, the gear 82. The rack portion is of sufficient length to remain in mesh with the gear during movement of the upper center unit with respect to the lower. Secured to the gear is a member 83 having an arcuate portion 84 formed with a T-slot 86 therein. Within the T-slot is a nut 88 having sides curved to fit the arcuate curve of the T-slot. A stud 89 having a ball 91 at one end thereof engaging a socket in one end of a connecting rod 90 also has a screw threaded connection 93 at its opposite end with the nut 88. It will be understood that the nut 88 is movable within the slot when the stud is unscrewed and will be fixed in any desired position of adjustment during operation of the device by screwing the stud into the nut 88 until the nut portion 95 of the stud engages the arcuate member.

Figure 14:
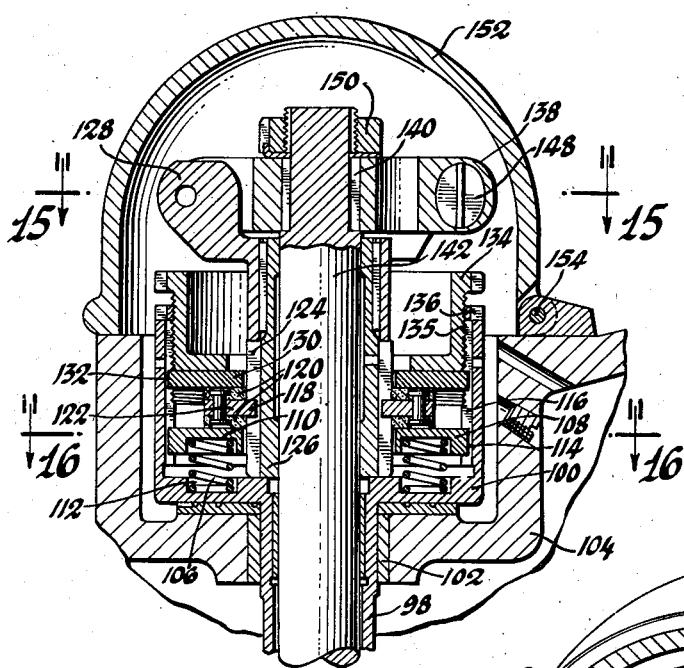
Figure 14 is a sectional view on line 14—14 in Figure 2.
Figure 16:
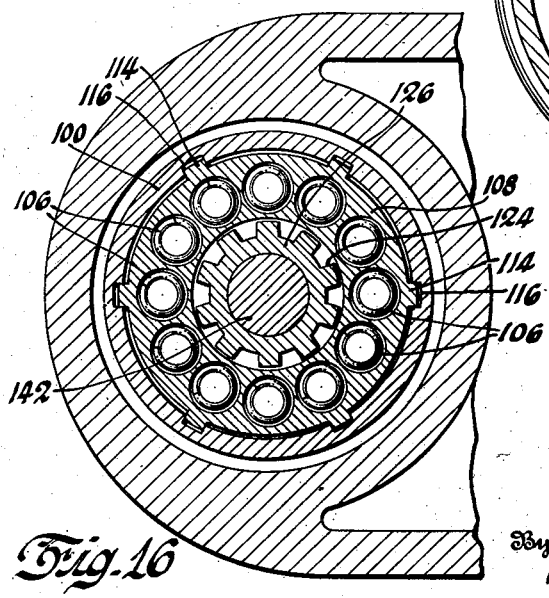
Figure 16 is a detail sectional view on line 16—16 in Figure 14.
Figure 17:
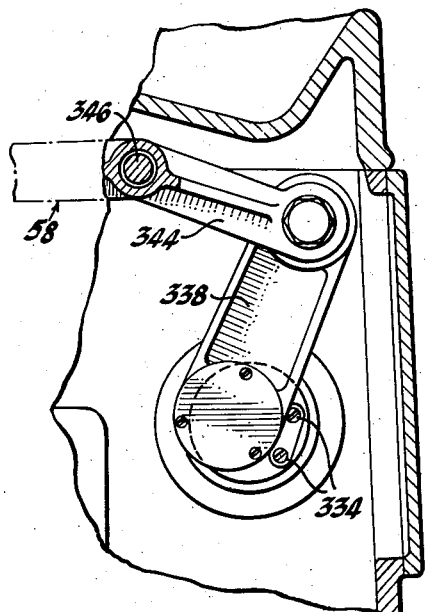
Figure 17 is a detail view with parts in section taken on line 17—17 in Figure 5.
Figure 18:
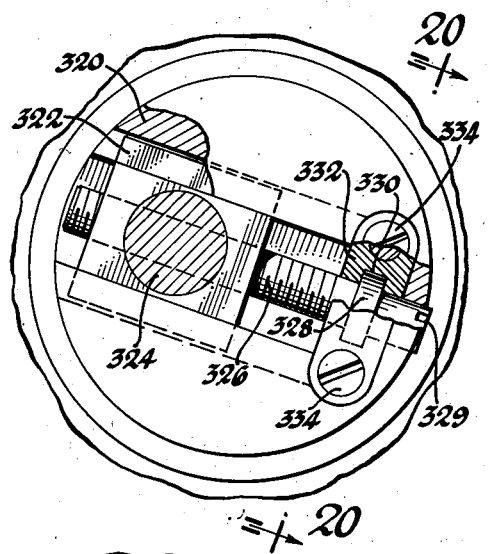
Figure 18 is a detail view on line 18—18 in Figure 5.
Figure 19:
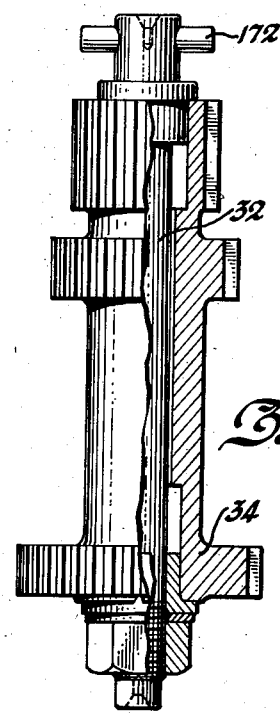
Figure 19 is a detail view of a gear to be lapped mounted on an arbor therefor.
Figure 20:
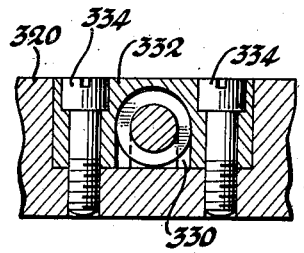
Figure 20 is a detail sectional view on line 20—20 in Figure 18.

The arcuate member may be calibrated to correspond to the helical angle of the gear to be lapped and the adjustment described is to permit gears having different helical angles to be lapped. The member 83 and gear 82 are carried by a bracket 220 and supported therein by bearings 221. The bracket in turn is secured by means of screws 222 to a projecting portion 223 of the frame of the upper center unit. The opposite end of the connecting rod has a yieldable socket connection 92 with the ball end 94 of an arm 96. The opposite end of the arm 96 is secured to a sleeve member 98 having a cup-shaped portion 100 at the upper end thereof; see especially Fig. 14. A bearing 102 is provided in the frame 104 of the upper unit for the member 98. A circular series of coiled springs 106 are mounted between the bottom of the cup-portion and an annular disc 108. Aligned pockets 110 and 112 formed in the annular disc and cup-portion respectively receive the opposite ends of the several springs and maintain the springs in position as will be readily understood from Figures 14 and 16.

Projections 114 on the annular disc engage mating slots 116 formed in the sides of the cup-portion 100. A clutch disc 122 having friction material 120 on either side thereof slidably engages the annular disc 108 and is held yieldably in contact therewith by means of the circular series of coiled springs. The clutch disc has a series of inwardly projecting portions 118 within corresponding slots 124 formed in a sleeve 126 fixed to a spider 128. A second annular disc 130 contacts the opposite side of the clutch disc and has outwardly extending projections 132 engaging the slots 116. By means of the member 134 having a screw-threaded connection 135 with the sides of the cup-shaped portion 100 of member 98 the clutch disc and annular discs which contact both sides of the clutch disc can be moved toward or away from the bottom of the cup-shaped portion in order to vary the force of the coiled springs. In this way the pressure on the friction material of the clutch disc may be varied and as a consequence the pressure on the engaging teeth of the lap and gear varied. A lock nut 136 secures the parts in adjusted position.

Figure 15:
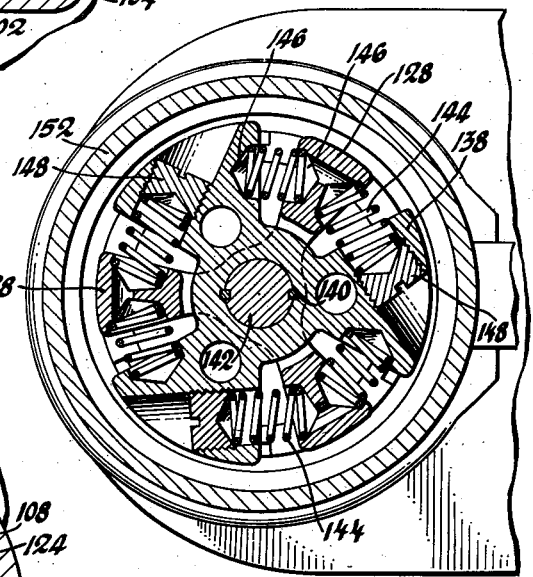
Figure 15 is a view on line 15—15 in Figure 14.

A second spider member 138 is keyed at 140 to a shaft 142 which through suitable connections, later to be described, drives the arbor 32 on which the gear to be lapped is mounted. Between the arms of the spider members are a series of coiled springs 144; see Figure 15. These springs fit within suitable openings 146 formed in the several arms of the spiders. Screw means 148 are adapted to vary the compressive force of the several springs as will be readily understood. The spring arrangement between the arms of the spiders takes up shock and also compensates for any inaccuracy in the helical angle adjustment. A nut 150 secures the spider in position on shaft 142. A cover 152 is hinged at 154 to the frame of the upper unit.

As best seen in Figure 8 the lower end of shaft 142 has a tapered opening 156 in which is a tapered spindle 158 having a conical tip 160 adapted to engage one end of the arbor 32 on which the gear to be lapped is mounted. Suitable bearings 164, 166 in the frame of the upper center unit support the shaft 142 for rotation therein. A coupling 168 having notches 170 in its lower portion engages a pin 172 in the upper end of the arbor to drive the latter.

In order to move the upper center unit with respect to the lower, there are provided an air cylinder, or other suitable hydraulic means, and members actuated thereby, which are illustrated in Figures 1, 2, 8, 9 and 10. In these figures, 174 is an air cylinder secured to the frame 104 of the upper center unit within which cylinder is a suitable piston 176 secured to one end of a rod 178. Compressed air, or other fluid, is admitted to the cylinder through the pipe 180 and forces the piston and rod downwardly. The lower portion of the rod has a rack portion 182 which engages with a gear 184 mounted on a tubular shaft 186 in the frame of the upper center unit.

The gear is normally fixed against rotation on shaft 186 by means of member 188 having clutch teeth 190 thereon which engage mating slots formed by clutch teeth 191 on the gear. Member 188 is keyed at 192 to the hollow shaft 186 having gear teeth 196 formed thereon engaging rack teeth 198 on the hollow shaft 6.

The frame of the upper center unit is splined at 190' to the hollow shaft 6 and hence downward movement of the rack portion 182 of the piston rod 178 will rotate shaft 186 and gear teeth formed thereon and cause the upper center unit to move upwardly along the hollow shaft 6. When air, or other fluid, is exhausted from the cylinder 174 the weight of the upper unit in cooperation with a spring 200 surrounding rod 178 will lower the upper center unit.

In order to permit the upper center unit to be moved by hand for adjustment purposes without the use of the air cylinder means the mechanism now to be described is used. Within the hollow shaft 186 is a rod 202 having a threaded end portion 204 on which is a nut 206 which secures the rod to the shaft. A pin 208 extending through the opposite end of the rod has its opposite ends extending into clutch member 188 and is slidable within slots 210 formed in the hollow shaft. By removing nut 206 the rod 202 and clutch member 188 may be moved to the left as viewed in Figure 10 to disengage the clutch teeth 190 of clutch member 188 and the teeth 191 on the gear. One end of the hollow shaft 186 has a portion 212 adapted to be engaged by a wrench, or other tool, whereby the hollow shaft may be rotated without the air cylinder means.

The rack 80 which rocks the gear 82 back and forth in timed relation with the reciprocation of the lapping ring has its rear side engaging a flanged roller 214 which is rotatably mounted on a pin 216. The pin extends through one end of a rod 218, see Fig. 8, which has a portion 219 engaging a cutout portion 224 of the bracket 220. The rod extends through an opening in the bracket and has a nut and washer 228 at the free end thereof. A coil spring 230 surrounding the rod 218 has one end contacting the washer and the other end contacting a flat surface 232 of the bracket. The spring is under compression and biases the rod 218, pin 216, roller 214 in a direction to resiliently hold the rack in engagement with the gear. For adjustment purposes an eccentric 234 is provided whereby movement thereof will move the rod 218 and associated parts against the force of spring 230 to enable the rack teeth to disengage the gear teeth.

In Figures 1, 2, 11, 12 and 13 there is shown a vertical adjusting means for the hollow shaft 6. Extending into the upper end of the hollow shaft and having a flange portion thereof secured to the hollow shaft is a member 236. The latter has an internal threaded portion 238 into which extends the threaded end 240 of a rod 242 having a gear 244 at its opposite end. A stub shaft 246 has a portion 248 at one end, adapted to be engaged by a wrench, and a gear 250 at its other end engaging the gear 244. Thus the hollow shaft 6 is supported from the top of the main frame by the rod 242 and may be raised and lowered by means of the stub shaft and gears. The upper and lower center units will be moved therewith. A suitable ball or other bearing 252 is provided in the top of frame for rotatably supporting the rod therein.

What may be termed an "angle adjusting means" is disclosed in Figures 1, 2, 3, 11, 12 and 13. A collar 254 surrounds the upper end of the hollow shaft 6 and has two ears 256 on the side toward the front of the machine. A pin 258 pivotally secures one end of a threaded rod 260 to the ears of said collar as best seen in Figures 11 and 12. The threaded portion of the rod has engagement with a threaded bushing 262 in the frame of the machine. The bushing is secured to the frame by means of a flanged collar 265 secured to the frame by means of screws 266. The flanged portion of the collar engages a flange 268 on said bushing. On the bushing 262 is a collar 270 which has a circular series of cutaway portions 272 adapted to contact the beveled head 274 of a screw 276. The collar is secured to the bushing by means of a screw 278.

In order to move the threaded rod within the bushing, the screw 276 is loosened until the head is free of a cutaway portion 270, whereupon the bushing may be rotated, as by means of a suitable wrench applied to the squared end 279 thereof. Since the bushing is fixed against longitudinal movement, rotation of the bushing will cause the threaded rod to move in or out and thus move the upper end of the hollow shaft. The circular series of cutaway portions may be calibrated so that any desired angle of adjustment may be readily obtainable.

The upper end of hollow shaft 6 will thus be moved and cause the shaft to be rocked back and forth on a pivot indicated generally at 280; see Figures 1, 3 and 4. The plane of the axis of the pivot as shown in these figures is substantially at the plane of the top of the lapping tool. The pivot comprises two stub shafts 282 and 284 mounted in the frame of the machine extending within mating openings 286 and 288 formed in a collar 290 surrounding the hollow shaft 6. Between the collar and hollow shaft is a bushing 292 which is formed of any suitable material resistant to wear. Movement of the hollow shaft 6 about the pivot will permit the axis of the shaft to be varied with respect to that of the sleeve 54 and the lapping ring mounted thereon. In this way the machine may be adjusted to remove a greater or less amount of material at either end of the teeth of the gear being lapped.

The upper and lower centers which support a gear to be lapped are adjustable so that the gear may be resiliently held in contact with the lapping ring. The adjustable means is shown in Figures 1, 2, 5, 6 and 7. In both sides of the lower portion of the frame or casing of the machine is a hollow member 294 having screw threaded engagement at 295 with the frame. Within the hollow portion of the member 294 is a T-member 296, the head of which contacts the frame of the lower center unit and the leg of which is hollow and has a coil spring 298 therein which biases the frame of the lower center unit to the right as viewed in Figure 7. An adjusting screw 300 acts as a stop for a plug 302 which contacts one end of the coil spring 298. By this means the compression of the coil spring may be varied as desired. A lock nut 304 secures each of the hollow members 294 and parts carried thereby in adjusted positions. The two members 294 and associated parts may be moved and thus cause the centers and arbor which supports the gear to be moved into operative position with respect to the lapping ring. When in the desired position the lock nuts will secure members 294 in place and the resiliently mounted T-members will provide a resilient support for the centers.

The mechanism whereby the sleeve 54 which supports the lapping ring is reciprocated, is best seen in Figures 4, 5, 17, 18 and 20. A motor 310 rotates a shaft 312 by means of a belt 314 which connects pulleys 316 and 318 mounted on the motor shaft and shaft 312, respectively. On one end of the shaft 312 is an enlargement 320 having a cutaway portion within which is adjustably mounted a slide block 322 carrying a stub shaft 324. A screw-threaded member 326 has a flange 328 thereon within a mating opening 330 formed in a member 332 secured to member 320 by means of screws 334. The screw-threaded member is connected to the slide block in order to move the same with the stub shaft 324 carried thereby.

It will be understood that the flange 328 holds the screw-threaded member 326 against movement lengthwise thereof; hence when the latter is rotated, as by means of a screw driver applied to the end 329 thereof, the screw-threaded connection with the slide block will cause the slide block to move in or out as desired. This will vary the amount of eccentricity of the stub shaft 324 with respect to the shaft 312 in order to vary the extent of reciprocation of the sleeve 54 and lapping ring carried thereby.

Rotatably secured to the stub shaft is one end of an arm or connecting rod 338. The other end of the arm carries a roller bearing 340 within which is a pin-connection 342 with an arm 344 formed as a portion of the yoke 58. The yoke is pivoted on a shaft 346 and thus movement of the arm 344 will cause the sleeve 54 and lapping ring to be rapidly reciprocated.

The worm 59 which rotates the gear 60 is driven by means of a motor 348. A suitable belt 350 connects a pulley on the motor shaft with a pulley secured to a shaft 352 on which the worm is fixed. Preferably the motor 348 is a reversible motor and by means of suitable controls (not shown) will rotate in one direction for a desired period and then will be reversed. In this way the sleeve 54 and lapping ring will first rotate in one direction and then in the other. Preferably, also, the movements in one direction will be greater than that in the other.

Figure 6:
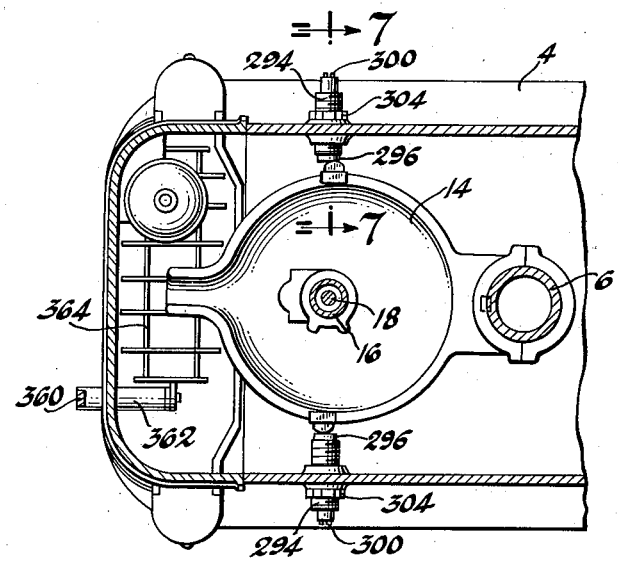
Figure 6 is a view on line 6—6 in Figure 1 showing means to resiliently secure in place the lower center unit.
Figure 7:
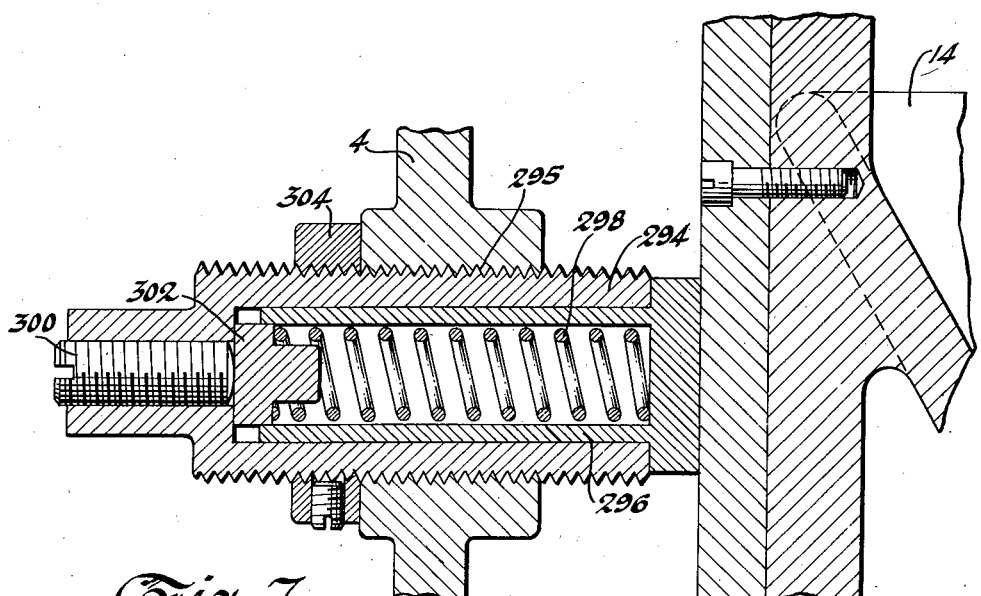
Figure 7 is a sectional view on line 7—7 in Figure 6 showing the construction of one of the members which resiliently secures the lower center unit in place.

In Figures 1, 2 and 6 of the drawings is seen a device whereby the abrasive particles of the lapping compound may be mixed with the liquid portion when beginning a lapping operation after the machine has been standing idle for a time. A handle 360 pivoted at 362 with an arm leading to a grill 364 mounted in the bottom of the tank for the lapping compound is adapted to be moved back and forth to reciprocate the grill to thoroughly agitate the lapping compound. When the device is in operation a suitable pump (not shown) will cause the compound to be forced onto the gear and lap. The compound will then pass downwardly through the sleeve 54 and the trough 14 and be returned to the tank. The flow of lapping compound into the tank from the trough 14 will agitate the lapping compound sufficiently to maintain the abrasive particles in suspension.

The description of the operation of the device will be clear from the foregoing detailed description of the device. This may be briefly summarized as follows: The operator will first mount the gear to be lapped in any suitable fixture and then place the same in the machine between the upper and lower center units. The lapping tool or lapping ring in the embodiment shown is then rapidly reciprocated to cause a relative sliding movement between the gear and lap. The rack driven by this reciprocatory movement causes the oscillation of the gear through an angle determined by the lead of the teeth of the gear and lap. If desired, to adjust the machine for a different helical angle, all that is necessary is to move the nut within the T slot of the arcuate member. For rapidly and efficiently moving the upper center unit with respect to the lower the fluid operated means is provided. If desired to remove a greater or lesser amount at either end of the teeth being lapped the hollow shaft may be moved about its pivot as will be readily understood from the detailed description. The lapping ring is rotated in mesh with the gear to be lapped and said gear is rotated by the lapping ring. Rotation of the gear is retarded by the friction between disc 122 and discs 108 and 130.

From the above it will be seen that I have provided a device for lapping gears that is readily adjustable for different sized gears and for gears having different helical angles. It will be understood that many different fixtures than the arbor disclosed may be used to support the gears to be lapped. Likewise the member described as the lapping ring may be a gear to be lapped and the member described as the gear may be the lapping tool. In other words, the lapping tool and gear may be reversed.

While the preferred form of the machine of this invention is a vertical type machine, it will be understood that certain features of the invention may be used in horizontal or other type machines.

It will be understood that many changes and modifications of the specific embodiment of my invention shown in the drawings may be made without departing from the spirit of my invention and I do not wish to limit the patent granted thereon except as necessitated by the prior art.

I claim:

1. In a gear lapping machine, a lap, means for supporting said lap, means for supporting a helical gear in mesh with said lap, means for rotating one of said lap supporting and gear supporting means, said means for rotating one of said lap supporting and gear supporting means rotating the other of said lap supporting and gear supporting means through interengagement of the lap and gear, means for reciprocating said means for rotating one of said lap supporting and gear supporting means, and means for rocking the helical gear through an angle determined by the lead of the teeth of the lap and gear in timed relation with the reciprocation of said rotated means comprising, a rack connected with the reciprocating means, a gear engaging said rack, an arm connected to said gear and resilient means between said arm and the support for the helical gear to absorb any uneven forces.

2. In a gear lapping machine, a lap, means for supporting said lap, means for supporting a helical gear in mesh with said lap, means for rotating one of said lap supporting and gear supporting means, said means for rotating one of said lap supporting and gear supporting means rotating the other of said lap supporting and gear supporting means through inter-engagement of the lap and gear, means for reciprocating said means for rotating one of said lap supporting and gear supporting means, and means for rocking the helical gear through an angle determined by the lead of the teeth of the lap and gear in timed relation with the reciprocation of said rotated means comprising, a rack connected with the reciprocating means, a gear engaging said rack, an arcuate member fixed to said gear, an arm adjustably connected to said arcuate member, a sleeve connected to said arm, a first spider, an adjustable clutch between said sleeve and said first spider, a second spider, springs between the arms of said first and second spiders, a spindle for engaging the work support and means for fixing said second spider to said spindle.

3. In a gear lapping machine, a lapping ring, means supporting said lapping ring, a spindle, an upper center unit and a lower center unit supported by said spindle, said units supporting a gear to be lapped in mesh with the lapping ring, means for moving said spindle and units supported thereby, means for moving said upper unit with respect to the lower, a pivotal support for said spindle and adjustable means for moving said spindle about said pivot.

4. A lapping machine as in claim 3, in which the means for moving the upper unit with respect to the lower comprises a cylinder fixed to said upper unit, a fluid operated piston within said cylinder, a rod having a rack at the lower end thereof, a gear driven by said rack, a shaft on which gear is fixed, a gear driven by said shaft and rack teeth formed on said spindle engaged by said last mentioned gear.

5. In a gear lapping machine for helical gears, a lap having helical teeth, a support for said lap, means for reciprocating said support, upper and lower means for supporting a helical gear in mesh with said lap, and means for rocking said gear in timed relation with the reciprocation of said support which comprises, a rack, a gear actuated thereby and means driven by the last mentioned gear to rock the upper means for supporting a helical gear in mesh with said lap.

6. In a gear lapping machine for helical gears, upper and lower center units for a helical gear to be lapped, a lap having helical teeth in mesh with the helical gear teeth, a support for said lap, means for reciprocating said support and lap carried thereby, means for moving the upper center unit with respect to the lower, a rack driven in timed relation with said reciprocation, a gear mounted on said upper center unit and driven by said rack, said rack being of such length that the rack and gear are in mesh during movement of the upper center unit with respect to the lower, and means actuated by the gear on the upper center unit for rocking the helical gear to be lapped in timed relation with the reciprocation of the lap.

7. In a lapping machine, a support, upper and lower centers carried thereby, said centers supporting a helical gear, means for moving the support and upper and lower centers as a unit, means for moving the upper center with respect to the lower, a sleeve, a lapping ring fixed to said sleeve and meshing with the helical gear to be lapped, means to rotate said sleeve and lapping ring, means to reciprocate said sleeve and lapping ring, resilient means for damping vibration of the reciprocating parts, a rod having one end connected to said reciprocating means and having its other end formed with a rack, a gear mounted for movement with the upper center and having meshing engagement with the rack, said rack being of such length that the engagement with the gear is maintained during movement of the upper center with respect to the lower, an arcuate member fixed to the gear, a sleeve, a rod having one end adjustably secured to the arcuate member and its other end connected to the sleeve, a slidable clutch actuated by the sleeve, a shaft for rocking the gear to be lapped, and resilient means between the clutch and shaft to absorb any uneven forces.

8. In a gear lapping machine, a lap for a helical gear, a support therefor, a support for maintaining a helical gear in mesh with the lap, means for reciprocating one of said supports with respect to the other and means including a rack and gear for oscillating one of the gear and lap supports through an angle determined by the lead of the teeth of the lap and gear in timed relation with the reciprocation, said rack being driven by said means for reciprocating.

9. A device as in claim 8, which includes means for moving the support for the helical gear with respect to the lap.

10. In a gear lapping machine, a lapping ring having internal helical teeth, a support for said lapping ring, means for maintaining a gear to be lapped having a lesser number of teeth than the lapping ring in mesh therewith, means for rotating said lapping ring support, means for reciprocating said support while it is rotating, and means driven by said reciprocating means for oscillating a gear to be lapped in timed relation with the reciprocation.

11. In a gear lapping machine as in claim 10, in which the last mentioned means includes a rack driven by said reciprocating means and a gear meshing therewith.

12. A gear lapping machine as in claim 10, which includes resilient adjustable stops for maintaining the gear in mesh with the lapping ring.

13. In a gear lapping machine, a lapping ring for a helical gear, a support therefor, two centers for supporting a helical gear in mesh with the lapping ring, means for rotating the lapping ring to rotate said gear, means for reciprocating the lapping ring with respect to said gear, means for moving one of said centers with respect to the other, and means to oscillate a gear to be lapped in timed relation with the reciprocation comprising, a rack movable with the reciprocating means and a gear engaging said rack and mounted for movement with one of said centers, said rack being of sufficient length to remain in engagement with the gear during movement of the latter with the center.

14. In a gear lapping machine, a spindle, an upper center unit and a lower center unit supported by said spindle, means for moving said spindle and units supported thereby, and means for moving said upper unit with respect to the lower comprising a cylinder fixed to said upper unit, a fluid operated piston within said cylinder, a rod having a rack at the lower end thereof, a gear driven by said rack, a shaft on which a gear is fixed, a gear driven by said shaft and rack teeth formed on said spindle engaged by said last mentioned gear.

15. In a gear lapping machine, a lap, means supporting said lap, a spindle, an upper center unit and a lower center unit supported by said spindle, said units supporting a gear to be lapped in mesh with the lap, one of the lap and gear being a ring member having internal teeth and the other of the lap and gear having a lesser number of teeth than does the ring member, means for moving said spindle and units supported thereby, means for moving said upper unit with respect to the lower, a pivotal support for said spindle in substantially the plane of the lap and adjustable means for moving said spindle about said pivot.

EDWARD R. NYLAND.